United States Patent
Kojo

(10) Patent No.: US 11,061,378 B2
(45) Date of Patent: Jul. 13, 2021

(54) PROCESSING APPARATUS AND METHOD OF CONTROLLING PROCESSING APPARATUS USING A TOUCH-SCREEN DISPLAYING AN IMAGE-CAPTURED WORKPIECE

(71) Applicant: DISCO CORPORATION, Tokyo (JP)

(72) Inventor: Tasuku Kojo, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 80 days.

(21) Appl. No.: 16/416,537

(22) Filed: May 20, 2019

(65) Prior Publication Data

US 2019/0369591 A1  Dec. 5, 2019

(30) Foreign Application Priority Data

Jun. 5, 2018  (JP) .............................. JP2018-107871

(51) Int. Cl.
    *G05B 19/402*  (2006.01)
    *G06F 3/0488*  (2013.01)
    *G06F 3/0484*  (2013.01)
    *G06F 3/045*  (2006.01)

(52) U.S. Cl.
    CPC ....... *G05B 19/402* (2013.01); *G06F 3/04845* (2013.01); *G06F 3/04883* (2013.01); *G05B 2219/45213* (2013.01); *G06F 3/045* (2013.01)

(58) Field of Classification Search
    CPC .................. G05B 19/402; G05B 19/19; G05B 2219/45213; G06F 3/04883; G06F 3/04845; G06F 3/045; B23K 26/00; B23K 26/702; H01L 21/78; H01L 21/304
    See application file for complete search history.

(56) References Cited

U.S. PATENT DOCUMENTS

| | | | |
|---|---|---|---|
| 2019/0171328 A1* | 6/2019 | Chih | G06T 7/0004 |
| 2019/0220185 A1* | 7/2019 | Cho | G06F 3/04883 |
| 2019/0361603 A1* | 11/2019 | Chen | G06F 3/0488 |

FOREIGN PATENT DOCUMENTS

JP  2009117776 A  5/2009

* cited by examiner

*Primary Examiner* — Kenneth M Lo
*Assistant Examiner* — Jonathan Michael Skrzycki
(74) *Attorney, Agent, or Firm* — Greer Burns & Crain, Ltd.

(57) ABSTRACT

In a method of controlling a processing apparatus having a touch-panel display: when an operator touches the display with a finger and moves the finger in an X-axis direction, a chuck table or a processing unit is moved in the X-axis direction for a distance depending on the distance that the finger is moved, and an image of a portion of a workpiece is moved in the X-axis direction on the display; and when the operator touches the display with a finger and moves the finger in a Y-axis direction, the chuck table or the processing unit is moved in the Y-axis direction for a distance depending on the distance that the finger is moved, and the image of the portion of the workpiece is moved in the Y-axis direction on the display.

3 Claims, 9 Drawing Sheets

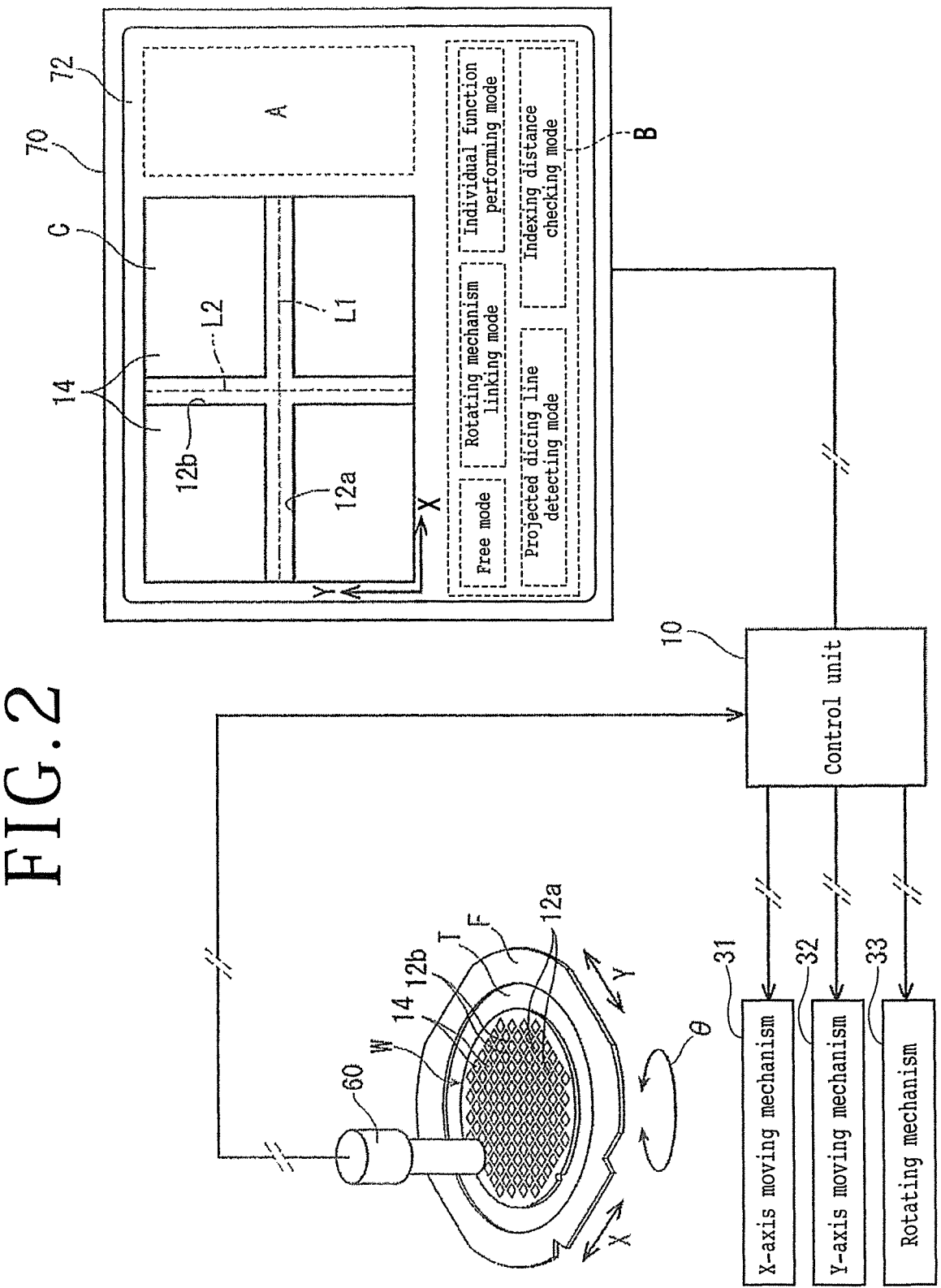

PROCESSING APPARATUS AND METHOD OF CONTROLLING PROCESSING APPARATUS USING A TOUCH-SCREEN DISPLAYING AN IMAGE-CAPTURED WORKPIECE

BACKGROUND OF THE INVENTION

Field of the Invention

The present invention relates to a processing apparatus that is capable of displaying an area of a workpiece that the operator wants to be displayed on display means, and a method of controlling such a processing apparatus.

Description of the Related Art

Wafers on which a plurality of devices such as integrated circuits (ICs), large-scale integration (LSI) circuits, or the like are formed in respective areas demarcated on their face sides by a grid of projected dicing lines are divided into individual device chips by a laser processing apparatus, a dicing apparatus, or the like. The divided device chips will be used in electric appliances including mobile phones, personal computers, and so on.

A laser processing apparatus includes a chuck table for holding a workpiece thereon, a laser beam irradiating unit irradiating the workpiece held on the chuck table with a laser beam, an X-axis moving mechanism moving the chuck table and the laser beam irradiating unit relatively to each other in an X-axis direction, a Y-axis moving mechanism moving the chuck table and the laser beam irradiating unit relatively to each other in a Y-axis direction, an image capturing unit capturing an image of the workpiece held on the chuck table, a rotating mechanism rotating the chuck table in a plane defined by an X-axis and a Y-axis, display means displaying an area whose image has been captured by the image capturing unit, and a control unit controlling the X-axis moving mechanism, the Y-axis moving mechanism, and the rotating mechanism.

The display means is connected to the control unit for communication therewith. The operator can touch either one of an X-axis moving button, a Y-axis moving button, and a rotating button displayed on the display means to individually operate the X-axis moving mechanism, the Y-axis moving mechanism, or the rotating mechanism to appropriately move an area whose image has been captured by the image capturing unit to display an area that the operator wants to see on the display means (see, for example, Japanese Patent Laid-open No. 2009-117776).

SUMMARY OF THE INVENTION

According to the technology disclosed in Japanese Patent Laid-open No. 2009-117776, in order to display an area that the operator wants to see on the display means, it is necessary for the operator to selectively operate the X-axis moving mechanism, the Y-axis moving mechanism, and the rotating mechanism while confirming the image of the captured area displayed on the display means and the kinds and positions of the buttons displayed on the display means. However, the practice is not user friendly. For making fine adjustments to an area to be displayed on the display means, furthermore, the operator needs to touch the display means many times, which is a tedious and time-consuming process. These problems can happen not only to the laser processing apparatus described above but to all processing apparatus such as dicing apparatus for cutting wafers with cutting blades.

It is therefore an object of the present invention to provide a processing apparatus which is capable of capturing an image of a workpiece with an image capturing unit according to a user friendly process and displaying an area of the workpiece to be displayed on displaying means, and a method of controlling such a processing apparatus.

In accordance with an aspect of the present invention, there is provided a processing apparatus including: a chuck table for holding a workpiece; a processing unit processing the workpiece held on the chuck table; an X-axis moving mechanism moving the chuck table and the processing unit relatively to each other in an X-axis direction; a Y-axis moving mechanism moving the chuck table and the processing unit relatively to each other in a Y-axis direction perpendicular to the X-axis direction; an image capturing unit capturing an image of the workpiece held on the chuck table; a rotating mechanism rotating the chuck table in a plane defined by an X-axis and a Y-axis; a control unit controlling at least the X-axis moving mechanism, the Y-axis moving mechanism, and the rotating mechanism; and display means connected to the control unit for communication therewith, for displaying an image of a portion of the workpiece captured by the image capturing unit and detecting coordinates of a position touched on the display means by an operator. The display means has, in cooperation of the control unit: an X-axis moving function that, when the operator touches the display means with a finger and moves the finger in the X-axis direction, operates the X-axis moving mechanism to move the chuck table or the processing unit in the X-axis direction for a distance depending on a distance that the finger is moved, and moves the image of the portion of the workpiece captured by the image capturing unit in the X-axis direction on the display means; a Y-axis moving function that, when the operator touches the display means with a finger and moves the finger in the Y-axis direction, operates the Y-axis moving mechanism to move the chuck table or the processing unit in the Y-axis direction for a distance depending on a distance that the finger is moved, and moves the image of the portion of the workpiece captured by the image capturing unit in the Y-axis direction on the display means; an obliquely moving function that, when the operator touches the display means with a finger and moves the finger in a direction oblique to the X-axis direction and the Y-axis direction, operates the X-axis moving mechanism and the Y-axis moving mechanism to move the chuck table or the processing unit in the oblique direction for a distance depending on a distance that the finger is moved, and moves the image of the portion of the workpiece captured by the image capturing unit in the oblique direction on the display means; and a rotating function that, when the operator touches the display means with a finger and moves the finger in a rotating direction, operates the rotating mechanism to rotate the chuck table for a distance depending on a distance that the finger is moved, and rotates the image of the portion of the workpiece captured by the image capturing unit on the display means.

In accordance with another aspect of the present invention, there is provided a method of controlling a processing apparatus including a chuck table for holding a workpiece, a processing unit processing the workpiece held on the chuck table, an X-axis moving mechanism moving the chuck table and the processing unit relatively to each other in an X-axis direction, a Y-axis moving mechanism moving the chuck table and the processing unit relatively to each other in a Y-axis direction perpendicular to the X-axis direction, an image capturing unit capturing an image of the workpiece held on the chuck table, a rotating mechanism rotating the chuck table in a plane defined by an X-axis and a Y-axis, a control unit controlling at least the X-axis moving mechanism, the Y-axis moving mechanism, and the rotating mechanism, and display means connected to the control unit for communication therewith, for displaying an image of a portion of the workpiece captured by the image capturing unit and detecting coordinates of a position touched on the display means by an operator, the method comprising: operating the X-axis moving mechanism to move the chuck table or the processing unit in the X-axis direction for a distance depending on a distance that a finger is moved when the operator touches the display means with the finger and moves the finger in the X-axis direction, and moving the image of the portion of the workpiece captured by the image capturing unit in the X-axis direction on the display means; operating the Y-axis moving mechanism to move the chuck table or the processing unit in the Y-axis direction for a distance depending on a distance that a finger is moved when the operator touches the display means with the finger and moves the finger in the Y-axis direction, and moving the image of the portion of the workpiece captured by the image capturing unit in the Y-axis direction on the display means; operating the X-axis moving mechanism and the Y-axis moving mechanism to move the chuck table or the processing unit in the oblique direction for a distance depending on a distance that a finger is moved when the operator touches the display means with the finger and moves the finger in a direction oblique to the X-axis direction and the Y-axis direction, and moving the image of the portion of the workpiece captured by the image capturing unit in the oblique direction on the display means; and operating the rotating mechanism to rotate the chuck table for a distance depending on a distance that a finger is moved when the operator touches the display means with the finger and moves the finger in a rotating direction, and rotating the image of the portion of the workpiece captured by the image capturing unit on the display means.

Preferably, the distance that the chuck table or the processing unit is moved is determined depending on a magnification at which the image of the portion of the workpiece is captured by the image capturing unit and the distance that the finger is moved on the display means.

Preferably, the workpiece includes a wafer having a plurality of devices formed on a face side thereof in respective areas that are demarcated by a plurality of intersecting projected dicing lines, and the method further comprises: bringing a position where the finger touches the display means closely to one of the projected dicing lines in the Y-axis direction after the wafer displayed on the display means is moved and the projected dicing lines on the wafer are positioned parallel to the X-axis direction, and displaying a first straight line over a straight-edge region of the one of the projected dicing lines which is detected first; then moving the position where the finger touches the display means in the Y-axis direction closely to the projected dicing line, and displaying a second straight line over a straight-edge region of the projected dicing line which is detected next; and detecting a region sandwiched between the first straight line and the second straight line as a projected dicing line.

Preferably, the method further includes detecting two adjacent ones of the projected dicing lines and calculating a distance between the two adjacent projected dicing lines.

Preferably, the workpiece includes a wafer having a plurality of devices formed on a face side thereof in respective areas that are demarcated by a plurality of intersecting projected dicing lines, and the method further includes: displaying a first reference line and a second reference line that initiate from one of the projected dicing lines on both sides of the one of the projected dicing lines in the Y-axis direction when the operator touches the display means and positions the projected dicing lines on the wafer parallel to the X-axis direction; intermittently indexing-feeding the wafer in the Y-axis direction for a distance depending on a pre-registered distance between adjacent ones of the projected dicing lines when the operator touches the display means and moves the image of the portion of the workpiece captured by the image capturing unit in the Y-axis direction; and checking if the distance between the adjacent projected dicing lines is proper or not depending on whether the first reference line and the second reference line are superposed on the projected dicing line on the wafer that is indexing-fed.

According to the present invention, it is not necessary to repeatedly confirm and operate the types and positions of buttons, and makes it possible to move a captured and displayed image of a portion of a workpiece in an intuitive manner based on the will of the operator, increasing the ease with which to operate the processing apparatus. The operator can finely adjust the displayed image of the portion of the workpiece by touching the display means and slightly moving the touched position. Therefore, the problem of having to touch a button many times for fine positional adjustment of the displayed image is eliminated.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 2 is a block diagram illustrating a mode of operation of the laser processing apparatus;

DETAILED DESCRIPTION OF THE PREFERRED EMBODIMENT

A laser processing apparatus to which a control method according to an embodiment of the present invention is applicable will be described below with reference to the accompanying drawings.

Figure 1:
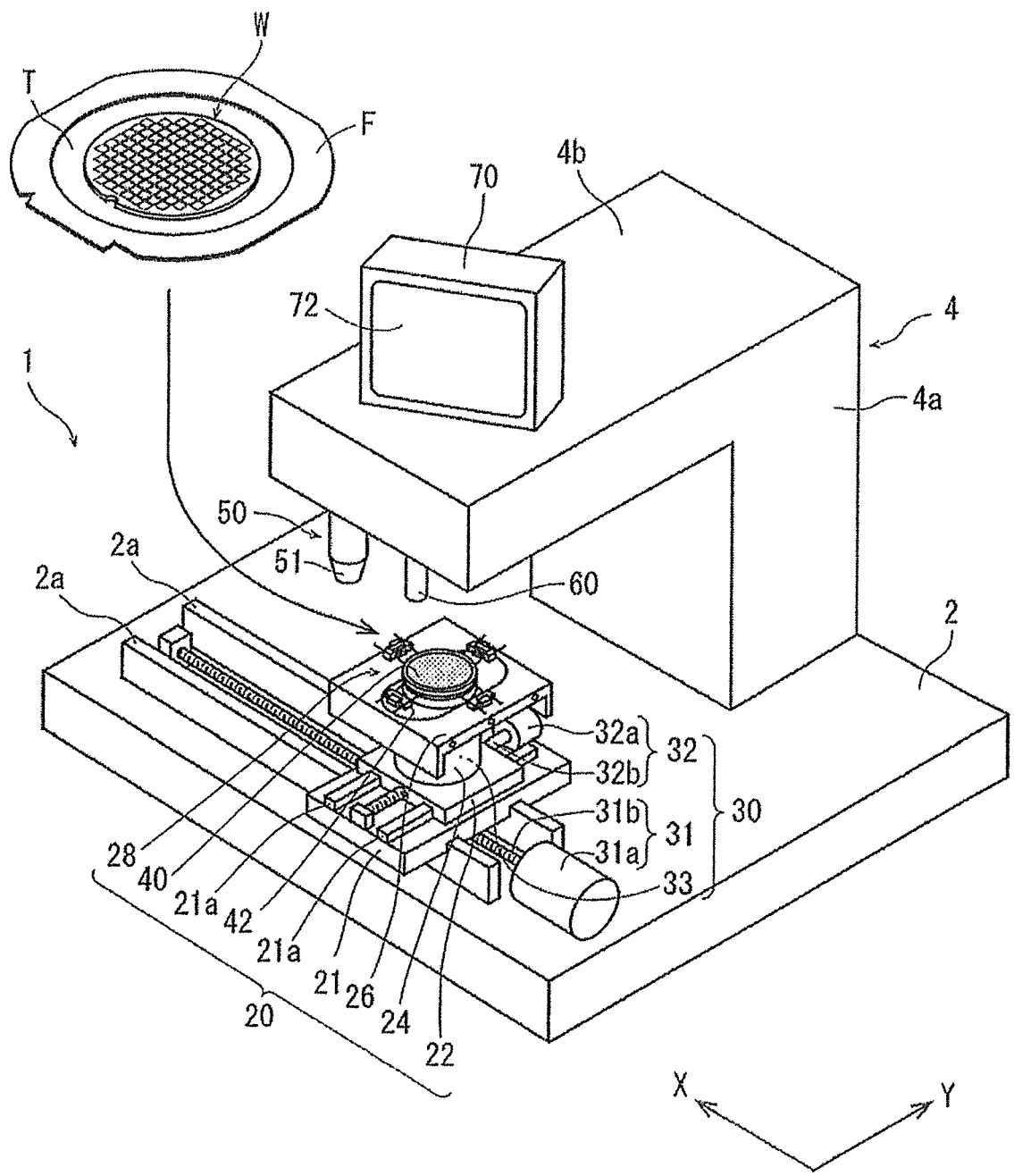
FIG. 1 is a perspective view illustrating an overall makeup of a laser processing apparatus according to an embodiment of the present invention.

FIG. 1 illustrates in perspective an overall makeup of a laser processing apparatus 1 according to the embodiment of the present invention. In FIG. 1, the laser processing apparatus 1 includes holding means 20 holding a workpiece, i.e., a wafer W, supported on a frame F by an adhesive tape T, a moving mechanism 30 moving the holding means 20, a laser beam irradiating unit 50 as processing means processing the wafer W held by the holding means 20, and display means 70 displaying various pieces of information thereon and giving the laser processing apparatus 1 operating instructions when the operator touches the display screen of the display means 70.

The holding means 20 includes a rectangular X-axis movable plate 21 mounted on a base 2 for movement in X-axis directions indicated by the arrow X in FIG. 1, a rectangular Y-axis movable plate 22 mounted on the X-axis movable plate 21 for movement in Y-axis directions indicated by the arrow Y in FIG. 1 that extend perpendicularly to the X-axis directions, the X-axis and Y-axis directions jointly defining an essentially horizontal plane, a hollow cylindrical support column 24 fixedly mounted on an upper surface of the Y-axis movable plate 22, and a rectangular cover plate 26 fixedly mounted on an upper end of the support column 24. A disk-shaped chuck table 28 is disposed on the cover plate 26 and extends upwardly through an oblong hole defined in the cover plate 26. The chuck table 28 holds the wafer W thereon and is rotatable about its own vertical axis by a rotating mechanism 33 housed in the support column 24. A disk-shaped suction chuck 40 that is made of a porous material and extends essentially horizontally is disposed on an upper surface of the chuck table 28. The suction chuck 40 is connected to suction means, not illustrated, by a channel extending in the support column 24. A plurality of clamps 42 are disposed at angular intervals on the chuck table 28 for securing the frame F that supports the wafer W to the suction chuck 40.

The moving mechanism 30 is disposed on the base 2 as means moving the holding means 20 and the laser beam irradiating unit 50 relatively to each other. The moving mechanism 30 includes an X-axis moving mechanism 31 processing-feeding the holding means 20 in the X-axis directions, a Y-axis moving mechanism 32 indexing-feeding the holding means 20 in the Y-axis directions, and the rotating mechanism 33 rotating the chuck table 28 of the holding means 20 about its own vertical axis. The X-axis moving mechanism 31 converts rotating movement of a stepping motor 31a into linear movement through a ball screw 31b and transmits the linear movement to the X-axis movable plate 21 to move the X-axis movable plate 21 in the X-axis directions along a pair of guide rails 2a on the base 2. The Y-axis moving mechanism 32 converts rotating movement of a stepping motor 32a into linear movement through a ball screw 32b and transmits the linear movement to the Y-axis movable plate 22 to move the Y-axis movable plate 22 in the Y-axis directions along a pair of guide rails 21a on the X-axis movable plate 21. The rotating mechanism 33 includes a stepping motor, not illustrated, housed in the support column 24 for turning the chuck table 28 through a desired angle about its own vertical axis. Though not illustrated, the X-axis moving mechanism 31, the Y-axis moving mechanism 32, and the rotating mechanism 33 are associated with respective position detecting means accurately detecting the positions in the X-axis and Y-axis directions of the chuck table 28 on the base 2 and the angular position of the chuck table 28 about its own vertical axis. The position detecting means transmits the detected positions to a control unit 10 (see FIG. 2), which generates command signals to actuate the X-axis moving mechanism 31, the Y-axis moving mechanism 32, and the rotating mechanism 33 to positionally control the chuck table 28 to move to an X coordinate position, a Y coordinate position, and an angular position 8 represented by the command signals.

The laser processing apparatus 1 also includes a frame block 4 disposed alongside of the moving mechanism 30. The frame block 4 includes a vertical wall 4a disposed vertically on the base 2 and a horizontal wall 4b extending horizontally from an upper end of the vertical wall 4a. The horizontal wall 4b of the frame block 4 houses an optical system, not illustrated, of the laser beam irradiating unit 50. The laser beam irradiating unit 50 includes a beam condenser 51 disposed on the lower surface of a distal end portion of the horizontal wall 4b. The beam condenser 51 accommodates a condensing lens, not illustrated, of the optical system for focusing a laser beam generated by a laser oscillator, not illustrated. The laser beam emitted from the laser beam irradiating unit 50 is applied to a desired position on the wafer W held by the holding means 20.

As illustrated in FIG. 2, the laser processing apparatus 1 includes the control unit 10 controlling various components of the laser processing apparatus 1. The control unit 10, which is in the form of a computer, includes a central processing unit (CPU) performing arithmetic operations according to control programs, a read only memory (ROM) storing the control programs, a random access memory (RAM) storing detected values, processed results, and so on, an input interface, and an output interface. The X-axis moving mechanism 31, the Y-axis moving mechanism 32, and the rotating mechanism 33 are electrically connected to the control unit 10, and can be controlled by command signals from the control unit 10.

An image capturing unit 60 capturing an image of the wafer W is disposed on the lower surface of the distal end portion of the horizontal wall 4b at a position adjacent to the beam condenser 51 in the X-axis directions. The image capturing unit 60 includes an ordinary image capturing device (charge coupled device (CCD)) 62 for capturing an image of the wafer W with a visible light beam, and illuminating means, not illustrated, illuminating the wafer W. Image information representing an image captured by the image capturing unit 60 is sent from the image capturing unit 60 to the control unit 10. The image information sent to the control unit 10 is used by the control unit 10 for positionally aligning the wafer W and the beam condenser 51 with each other, inspecting the wafer W, and so on in relation to a laser processing process on the laser processing apparatus 1.

The display means 70 includes a display unit 72. The display unit 72 is in the form of a touch panel capable of displaying the coordinates of a position where the operator has touched the display unit 72, e.g., a liquid crystal display panel for displaying information from the control unit 10. The touch panel is of a known type such as a resistive film type, for example. The resistive film touch panel has a glass surface with a transparent electrode film disposed thereon and a film surface. When the operator touches the film surface, electrodes on the film surface and the glass surface are brought into contact with each other, allowing an electric current to flow therebetween. A voltage change caused by the electric current is detected to detect the X and Y coordinates of the position where the operator has touched the film surface. The display means 70 and the control unit 10 are connected to each other for communication therebetween. The coordinates of the position where the operator has touched the display panel 72 are sent from the display means 70 to the control unit 10. The coordinates of the touched position are processed by the control unit 10 according to the control programs stored in the ROM and/or are stored in the RAM if necessary. The touch panel according to the present embodiment is not limited to the resistance film touch panel described above, but may be of any of known types such as an electrostatic capacitive type or the like.

The control unit 10 thus arranged generates and outputs control signals or command signals for actuating at least the X-axis moving mechanism 31, the Y-axis moving mechanism 32, the rotating mechanism 33, and the laser beam irradiating unit 50 according to the control programs.

The laser processing apparatus 1 according to the present embodiment is of the general makeup described above. Operation of the laser processing apparatus 1 will now be described below. FIG. 2 illustrates the wafer W positioned directly below the image capturing unit 60. FIG. 2 also illustrates a conceptual representation of the manner in which the image capturing unit 60 captures an image of a given area on the face side of the wafer W, the display unit 72 of the display means 70 displays the captured image information, and the X-axis moving mechanism 31, the Y-axis moving mechanism 32, and the rotating mechanism 33 are controlled by command signals from the control unit 10.

The wafer W has a plurality of devices 14 formed on its face side in respective areas that are demarcated by a grid of projected dicing lines 12a extending in a first direction and projected dicing lines 12b extending in a second direction perpendicular to the first direction. The display unit 72 of the display means 70, which may be a liquid crystal display panel having a touch panel function, as described above, has a display screen divided into a display zone A for displaying information relative to details of a processing operation carried out by the laser processing apparatus 1, a display zone B for displaying mode changing buttons, etc. that can be touched by the operator to select and indicate various operation modes to be described later, and a display zone C for displaying image information captured by the image capturing unit 60. The display zone C displays central lines L1 and L2 that pass through its center along X-axis and Y-axis directions for the operator to accurately recognize the X-axis and Y-axis directions and the central position in the display zone C. Details of the display zone A are omitted from illustration.

A process of controlling operation of the X-axis moving mechanism 31, the Y-axis moving mechanism 32, and the rotating mechanism 33 by touching the display unit 72 of the display means 70 will be described below.

The operator touches a free mode button, i.e., one of the mode changing buttons displayed in the display zone B, to select a free mode for freely controlling the moving mechanism 30 in connection with touching and sliding movements of the operator's finger in the display zone C.

Figure 3A:
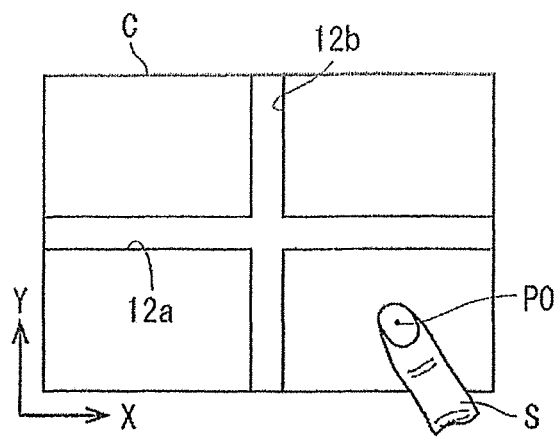
FIGS. 3A through 3D are views illustrating the manner in which an X-axis moving mechanism and a Y-axis moving mechanism of the laser processing apparatus operate.
Figure 3B:
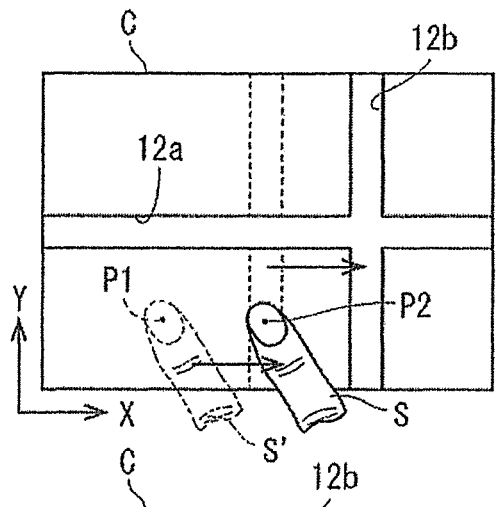

As illustrated in FIG. 3A, an image of the face side of the wafer W that has been captured by the image capturing unit 60 is displayed at an enlarged scale on a predetermined magnification in the display zone C. The image capturing unit 60 is fixed in position with respect to the X-axis and Y-axis directions of the base 2, so that the X-axis and Y-axis directions of images displayed in the display zone C agree with the X-axis and Y-axis directions of the base 2 at all times. When the operator touches the display zone C with its finger S, the display unit 72 that functions as a touch panel recognizes a touched position P0 where the finger S has touched the display zone C, and sends, from time to time, X and Y coordinates of the touched position P0 to the control unit 10.

If the operator wants to move the wafer W whose image is being captured by the image capturing unit 60 to the right in an X-axis direction to change the portion of the wafer W that is displayed in the display zone C, the operator touches the display zone C at a position P1 indicated by a finger S' as illustrated FIG. 3S. The display unit 72 immediately sends coordinates (P1 (X1, Y1)) of the touched position P1 to the control unit 10. Then, the operator moves the finger S' to the right in the X-axis direction to the position indicated by the finger S. The touched position P1 (X1, Y1) now changes to a touched position P2 (X2, Y2).

Since the display unit 72 sends the touched position to the control unit 10 from time to time, the control unit 10 detects the change from the touched position P1 (X1, Y1) to the touched position P2 (X2, Y2), and controls the X-axis moving mechanism 31 to move the chuck table 28 in the X-axis direction based on the change (X1-X2) in the touched position in the X-axis direction. The distance that the X-axis moving mechanism 31 is to move the chuck table 28 in the X-axis direction is determined in view of the change in the touched position in the display zone C and the magnification of the image of the wafer W displayed in the display zone C. In other words, the distance that the wafer W whose image has been captured by the image capturing unit 60 and displayed in the display zone C is moved is commensurate with the distance that the position touched in the display zone C by the operator is moved. For example, if a distance of 10 cm in the display zone C corresponds to an actual distance of 100 μm on the wafer W, then when the touched position P1 changes to the touched position P2 in the X-axis direction over a distance of 10 cm in the display zone C, the control unit 10 controls the X-axis moving mechanism 31 to move the chuck table 28 over a distance of 100 μm in the X-axis direction. As a result, when the chuck table 28 is moved, a projected dicing line 12b' indicated by the dotted lines in the display zone C moves to a projected dicing line 12b indicated by the solid lines in the display zone C.

Figure 3C:
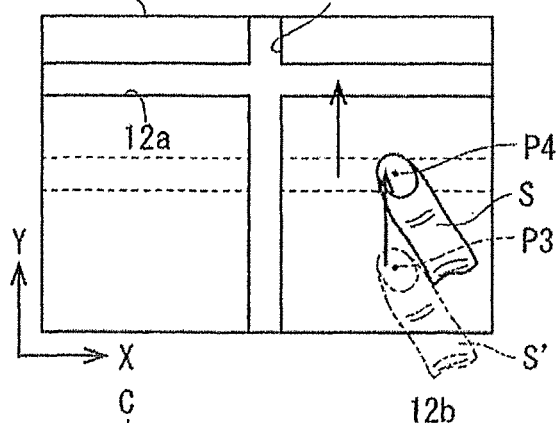

If the operator wants to move the wafer W whose image is being captured by the image capturing unit 60 upwardly in a Y-axis direction to change the portion of the wafer W that is displayed in the display zone C, the operator touches the display zone C at a position P3 indicated by a finger S' as illustrated in FIG. 3C. The display unit 72 immediately sends coordinates (P3 (X3, Y3)) of the touched position P3 to the control unit 10. Then, the operator moves the finger S' upwardly in the Y-axis direction to the position indicated by the finger S. The touched position P3 (X3, Y3) now changes to a touched position P4 (X4, Y4).

As illustrated in FIG. 3C, having detected the change from the touched position P3 (X3, Y3) to the touched position P4 (X4, Y4), the control unit 10 controls the Y-axis moving mechanism 32 to move the chuck table 28 in the Y-axis direction based on the change (Y3-Y4) in the touched position in the Y-axis direction. The distance that the Y-axis moving mechanism 32 is to move the chuck table 28 in the Y-axis direction is determined in view of the change in the touched position in the display zone C and the magnification of the image of the wafer W displayed in the display zone C, in the same manner as the distance that the X-axis moving mechanism 31 is to move the chuck table 28 in the X-axis direction, as described above. The wafer W whose image is displayed in the display zone C is thus positionally changed over a distance depending on the change in the touched position in the display zone C. As a result, when the chuck table 28 is moved, a projected dicing line 12a' indicated by the dotted lines in the display zone C moves to a projected dicing line 12a indicated by the solid lines in the display zone C.

Figure 3D:
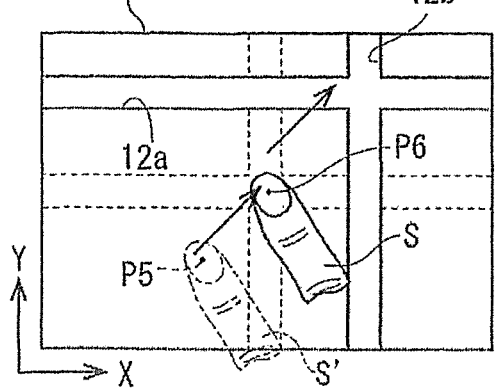

If the operator wants to move the wafer W whose image is being captured by the image capturing unit 60 obliquely upwardly to change the portion of the wafer W that is displayed in the display zone C, the operator touches the display zone C at a position P5 indicated by a finger S' as illustrated FIG. 3D. The display unit 72 immediately sends coordinates (P5 (X5, Y5)) of the touched position P5 to the control unit 10. Then, the operator moves the finger S' obliquely upwardly to the position indicated by the finger S. The touched position P5 (X5, Y5) now changes to a touched position P6 (X6, Y6).

The control unit 10 detects the change from the touched position P5 (X5, Y5) to the touched position P6 (X6, Y6), as illustrated in FIG. 3D, and controls the X-axis moving mechanism 31 to move the chuck table 28 in the X-axis direction based on the change (X5-X6) in the touched position in the X-axis direction. Concurrently, the control unit 10 also controls the Y-axis moving mechanism 32 to move the chuck table 28 in the Y-axis direction based on the change (Y5-Y6) in the touched position in the Y-axis direction. Stated otherwise, the chuck table 28 is moved obliquely upwardly depending on the change in the touched position where the operator has touched the display zone C. The distances that the X-axis moving mechanism 31 is to move the chuck table 28 in the X-axis direction and the Y-axis moving mechanism 32 is to move the chuck table 28 in the Y-axis direction are determined in view of the change in the touched position in the display zone C and the magnification of the image of the wafer W displayed in the display zone C, in the same manner as described above. The wafer W whose image is displayed in the display zone C is thus positionally changed in a direction and over a distance depending on the direction in which the touched position is moved in the display zone C and the change in the touched position in the display zone C. As a result, when the chuck table 28 is moved, projected dicing lines 12a' and 12b' indicated by the dotted lines in the display zone C move to projected dicing lines 12a and 12b indicated by the solid lines in the display zone C.

In the free mode described above, the operator can freely change the position of the wafer W displayed in the display zone C by touching the display zone C and moving the touched position in the display zone C. A rotating mechanism linking mode for linking the rotating mechanism 33, in addition to the X-axis moving mechanism 31 and the Y-axis moving mechanism 32, to rotate the chuck table 28 about its own vertical axis will be described below with reference to FIGS. 4A and 4B. The rotating mechanism linking mode refers to a mode for rotating the wafer W about a predetermined position in the image displayed in the display zone C, e.g., a central point O where the central lines L1 and L2 intersect with each other.

The operator can activate the rotating mechanism linking mode by touching a rotating mechanism linking mode button displayed in the display zone B. After activating the rotating mechanism linking mode, the operator touches the display zone C with its finger S' and moves the finger S' from a touched position P7 to a touched position P8 indicated by a finger S. An angle θ formed between a dotted line interconnecting the central point O and the touched position P7 and a dotted line interconnecting the central point O and the touched position P8 is an angle through which the operator wants to rotate the wafer W. The control unit 10 operates the X-axis moving mechanism 31, the Y-axis moving mechanism 32, and the rotating mechanism 33 in order to secure the position of the central point O of the display zone C to keep it unchanged and to rotate the wafer W displayed in the display zone C through the angle θ.

Figure 4A:
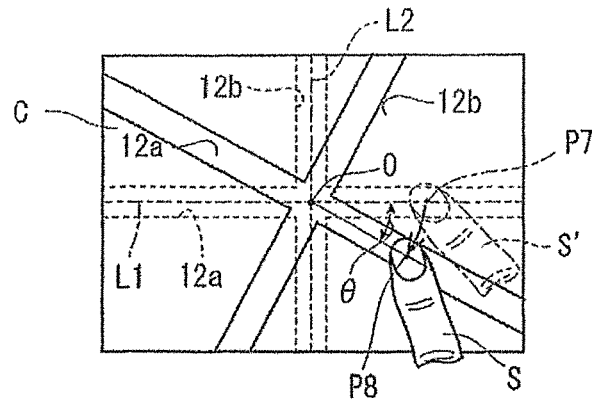
FIGS. 4A and 4B are views illustrating the manner in which a rotating mechanism of the laser processing apparatus operate.
Figure 4B:
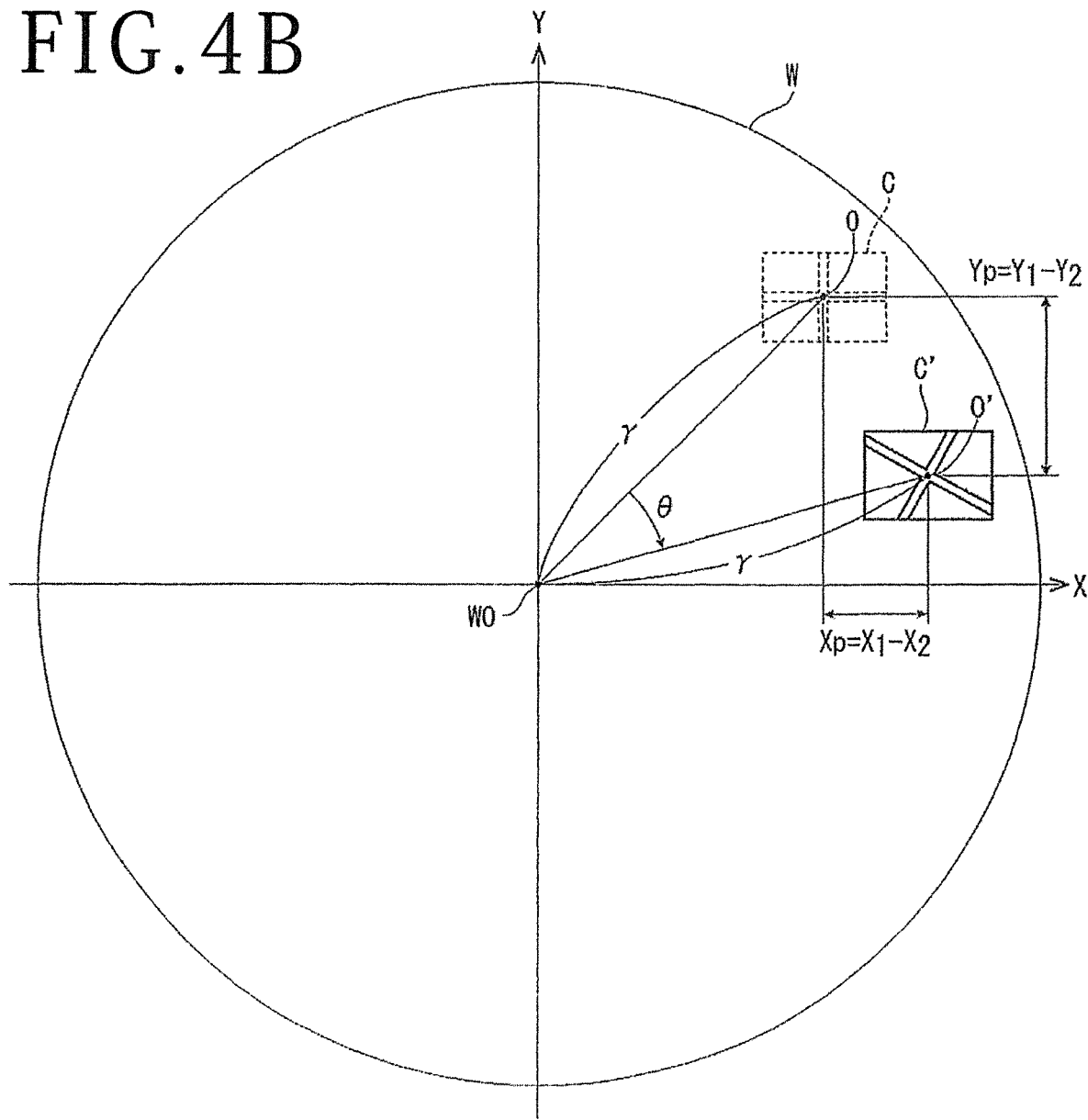

The process of securing the central point O of the display zone C and rotating the wafer W will be described in greater detail below with reference to FIG. 4B as well as FIG. 4A. A display zone C indicated by the dotted lines in FIG. 4B is a display zone C, i.e., a captured image zone, representing the wafer W before it is rotated, and is illustrated at an enlarged scale for illustrative purposes. The rotating mechanism 33 has a center of rotation that is aligned with a center of rotation WO of the wafer W and is positioned leftwardly and downwardly outside of the display zone C. For rotating the wafer W through the angle θ about the center of rotation WO with the rotating mechanism 33, as illustrated in FIG. 4B, if the distance between the center of rotation WO of the wafer W and the central point O ($X_1$, $Y_1$) of the display zone C is represented by r, then a central point O' ($X_2$, $Y_2$) of the display zone C after it has been rotated through the angle θ can be calculated according to polar coordinates based on the distance r and the angle θ. Based on these coordinates, $Xp=X_1-X_2$ and $Yp=Y_1-Y_2$ are calculated as distances that the X-axis moving mechanism 31 and the Y-axis moving mechanism 32 are to be operated to move the chuck table 28 in order to prevent the central point O of the display zone C from being changed, i.e., in order to keep the central point O of the display zone C and the central point O' of the display zone C after it has been rotated through the angle θ in alignment with each other. When the wafer W is rotated through the angle θ by the rotating mechanism 33, the control unit 10 operates the X-axis moving mechanism 31, the Y-axis moving mechanism 32, and the rotating mechanism 33 based on the calculated distances. The image of the wafer W is now displayed as indicated by the solid lines in the display zone C' in FIG. 4B. In other words, as illustrated in FIG. 4A, the wafer W is rotated through the angle θ while the central point O of the display zone C is being fixed.

In the above embodiment, the operator rotates the wafer W through the angle θ while the central point O of the display zone C is being fixed by activating the rotating mechanism linking mode by touching the rotating mechanism linking mode button displayed in the display zone B. However, the present invention is not limited to the illustrated rotating mechanism linking mode. Rather, while the free mode is being selected, the operator may touch a desired point in the display zone C with a finger, then touch another desired point in the display zone C with another finger, and rotate the subsequently touched position through a desired angle about the previously touched position to rotate the displayed wafer W about the previously touched position. With the previously touched position being regarded as a central point to be fixed, the distances that the X-axis moving mechanism 31 and the Y-axis moving mechanism 32 are to be operated to move the chuck table 28 may be calculated according to the above process of rotating the wafer W through the angle while the central point O of the display zone C is being fixed. In this manner, the displayed wafer W can be rotated irrespectively of the mode changing buttons displayed in the display zone B.

Next, an individual function performing mode for controlling either one of the X-axis moving mechanism 31, the Y-axis moving mechanism 32, and the rotating mechanism 33 to function individually to move the portion of the wafer W that is displayed in the display zone C will be described below.

Figure 5A:
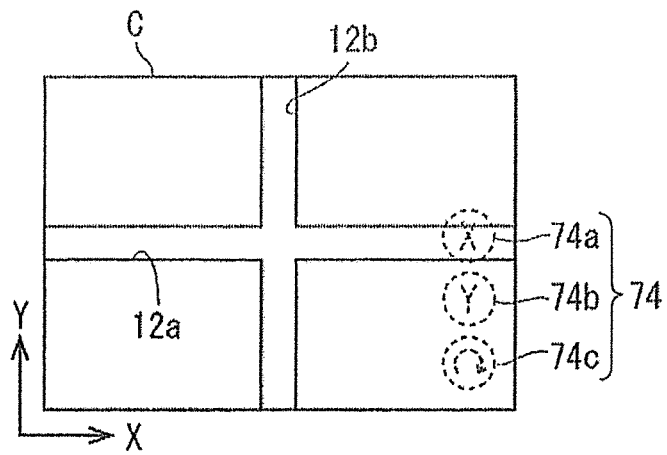
FIGS. 5A through 5C are views illustrating a mode of operation of the X-axis moving mechanism.

For carrying out the individual function performing mode, the operator touches an individual function performing mode button displayed in the display zone B to select the individual function performing mode. When the individual function performing mode is selected, as illustrated in FIG. 5A, individual function selection buttons 74 each for selecting one of the X-axis moving mechanism 31, the Y-axis moving mechanism 32, and the rotating mechanism 33 are displayed in a portion of the display zone C. According to the present embodiment, the individual function selection buttons 74 include a button 74a for selecting the X-axis moving mechanism 31, a button 74b for selecting the Y-axis moving mechanism 32, and a button 74c for selecting the rotating mechanism 33 that are arranged successively from above in the order named in a right lower portion of the display zone C. Initially, as illustrated in FIG. 5A, the buttons 74a, 74b, and 74c are displayed as being not selected, e.g., in a semitransparent state indicated by the dotted lines where the wafer W displayed in the display zone C can be almost fully seen through the buttons 74a, 74b, and 74c. With the buttons 74a, 74b, and 74c not selected in the see-through state, the wafer W displayed in the display zone C cannot be moved even if the operator touches the display zone C other than the individual function selection buttons 74 as the touched position is not recognized.

Figure 5B:
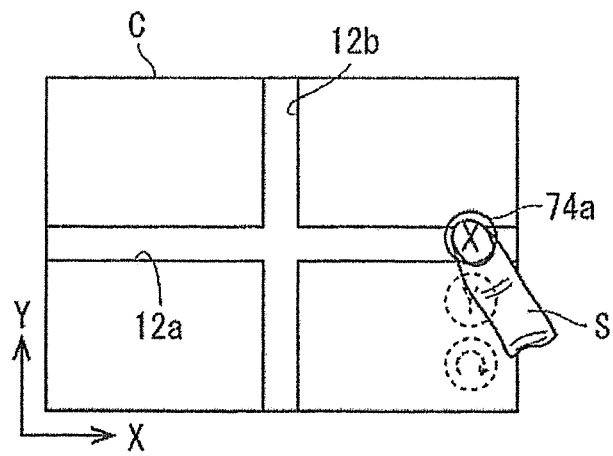
Figure 5C:
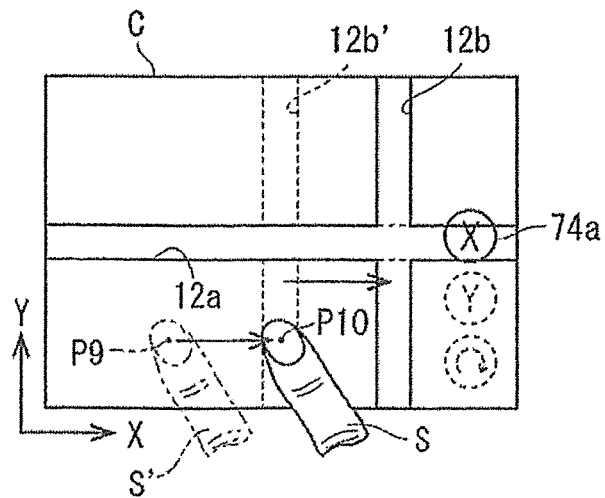

Then, in the initial state illustrated in FIG. 5A, the operator touches the uppermost button 74a for selecting the X-axis moving mechanism 31, among the individual function selection buttons 74, as illustrated in FIG. 5B. When the button 74a is touched, the button 74a is highlighted as indicated by the solid lines in FIG. 5B, allowing the operator to confirm with ease that the X-axis moving mechanism 31 is selected as an operation target, i.e., the X-axis moving function is made effective. Then, for moving the wafer W whose image is being captured by the image capturing unit 60 to the right in the X-axis direction to change the portion of the wafer W that is displayed in the display zone C, the operator touches the display zone C at a position P9 indicated by a finger S' as illustrated FIG. 5C. The display unit 72 sends coordinates (P9 (X9, Y9)) of the touched position P9 to the control unit 10. Then, the operator moves the finger S' to the right in the X-axis direction to the position indicated by the finger S. The touched position P9 (X9, Y9) now changes to a touched position P10 (X10, Y10).

Since the display unit 72 sends the touched position to the control unit 10 from time to time, the control unit 10 detects the change from the touched position P9 (X9, Y9) to the touched position P10 (X10, Y10), and controls only the X-axis moving mechanism 31 to move the chuck table 28 in the X-axis direction based on the change (X9-X10) in the touched position in the X-axis direction, not responding to any change (Y9-Y10) in the touched position in the Y-axis direction. The distance that the X-axis moving mechanism 31 is to move the chuck table 28 in the X-axis direction is determined in view of the change in the touched position in the display zone C and the magnification of the image of the wafer W displayed in the display zone C, as is the case with the free mode described above. This individual function performing mode is different from the free mode in that the control unit 10 operates only the X-axis moving mechanism 31 when the touched position P9 changes to the touched position P10, and does not operate the Y-axis moving mechanism 32 and the rotating mechanism 33 even if the Y coordinate of the touched position P9 and the Y coordinate of the touched position P10 are different from each other.

Figure 6A:
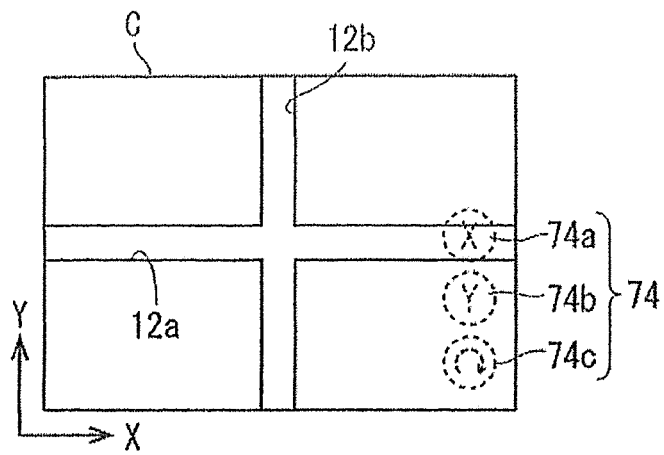
FIGS. 6A through 6C are views illustrating a mode of operation of the Y-axis moving mechanism.

The individual function performing mode in which only the Y-axis moving mechanism 32 is operated will be described below with reference to FIGS. 6A through 6C. Initially, as illustrated in FIG. 6A, the buttons 74a, 74b, and 74c are displayed as being not selected, e.g., in a semitransparent state indicated by the dotted lines where the wafer W displayed in the display zone C can be almost fully seen through the buttons 74a, 74b, and 74c. With the buttons 74a, 74b, and 74c not selected in the semitransparent state, the wafer W displayed in the display zone C cannot be moved even if the operator touches the display zone C other than the individual function selection buttons 74 as the touched position is not recognized.

Figure 6B:
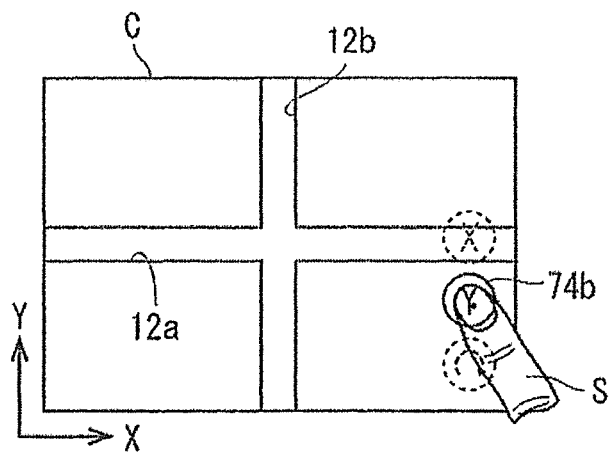
Figure 6C:
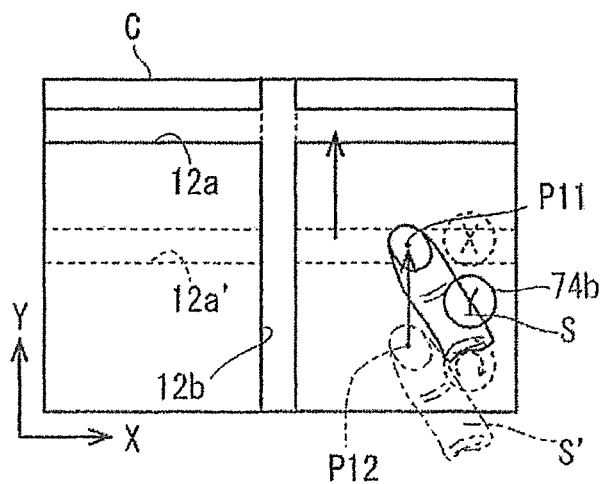

Then, in the initial state illustrated in FIG. 6A, the operator touches the second button 74b from above for selecting the Y-axis moving mechanism 32, among the individual function selection buttons 74, as illustrated in FIG. 6B. When the button 74b is touched, the button 74b is highlighted as indicated by the solid lines in FIG. 6B, allowing the operator to confirm with ease that the Y-axis moving mechanism 32 is selected, i.e., the Y-axis moving function is made effective. Then, for moving the wafer W whose image is being captured by the image capturing unit 60 upwardly in the Y-axis direction to change the portion of the wafer W that is displayed in the display zone C, the operator touches the display zone C at a position P11 indicated by a finger S' as illustrated FIG. 6C. The display unit 72 sends coordinates (P11 (X11, Y11)) of the touched position P11 to the control unit 10. Then, the operator moves the finger S' upwardly in the Y-axis direction to the position indicated by the finger S. The touched position P11 (X11, Y11) now changes to a touched position P12 (X12, Y12).

Since the display unit 72 sends the touched position to the control unit 10 from time to time, the control unit 10 detects the change from the touched position P11 (X11, Y11) to the touched position P12 (X12, Y12), and controls only the Y-axis moving mechanism 32 to move the chuck table 28 in the Y-axis direction based on the change (Y11-Y12) in the touched position in the Y-axis direction, not responding to any change (X11-X12) in the touched position in the X-axis direction. The distance that the Y-axis moving mechanism 32 is to move the chuck table 28 in the Y-axis direction is determined in view of the change in the touched position in the display zone C and the magnification of the image of the wafer W displayed in the display zone C. In other words, the distance that the wafer W is moved is commensurate with the distance that the position touched in the display zone C by the operator is moved. The control unit 10 operates only the Y-axis moving mechanism 32 when the touched position P11 changes to the touched position P12, and does not operate the X-axis moving mechanism 31 and the rotating mechanism 33 even if the X coordinate of the touched position P11 and the X coordinate of the touched position P12 are different from each other.

Figure 7A:
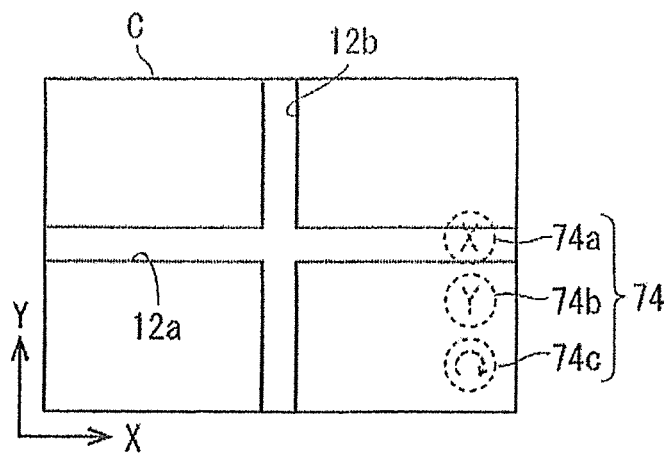
FIGS. 7A through 7C are views illustrating a mode of operation of the rotating mechanism.

The individual function performing mode in which only the rotating mechanism 33 is operated will be described below with reference to FIGS. 7A through 7C. Initially, as illustrated in FIG. 7A, the buttons 74a, 74b, and 74c are displayed as being not selected, e.g., in a semitransparent state indicated by the dotted lines where the wafer W displayed in the display zone C can be almost fully seen through the buttons 74a, 74b, and 74c. With the buttons 74a, 74b, and 74c not selected in the semitransparent state, the wafer W displayed in the display zone C cannot be moved even if the operator touches the display zone C other than the individual function selection buttons 74 as the touched position is not recognized.

Figure 7B:
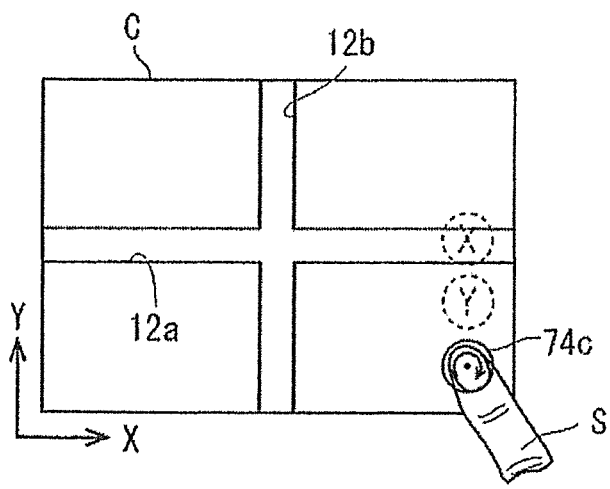
Figure 7C:
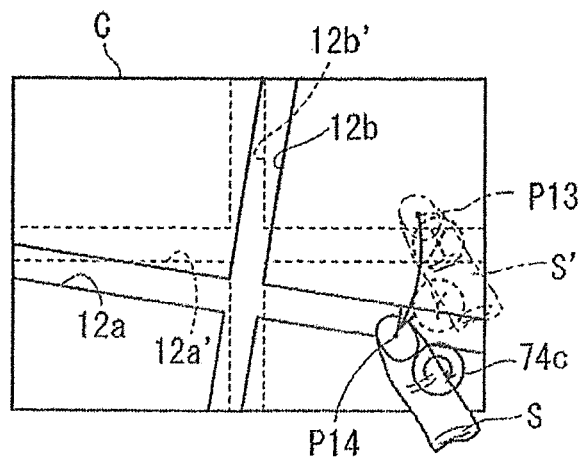

Then, in the initial state illustrated in FIG. 7A, the operator touches the third button 74c from above for selecting the rotating mechanism 33, among the individual function selection buttons 74, as illustrated in FIG. 7B. When the button 74c is touched, the button 74c is highlighted as indicated by the solid lines in FIG. 7B, allowing the operator to confirm with ease that the rotating mechanism 33 is selected, i.e., the rotating function is made effective. Then, for rotating the wafer W whose image is being captured by the image capturing unit 60 to change the portion of the wafer W that is displayed in the display zone C, the operator touches the display zone C at a position P13 indicated by a finger S' as illustrated FIG. 7C. When the rotating function is effective as illustrated in FIG. 7C, only the rotating mechanism 33 is operable, and the center of rotation of the wafer W is not within the image displayed in the display zone C, but is positioned leftwardly outside of the display zone C. The display unit 72 sends coordinates (P13 (X13, Y13)) of the touched position P13 to the control unit 10. Then, the operator moves the finger S' downwardly in the Y-axis direction to the position indicated by the finger S. The touched position P13 (X13, Y13) now changes to a touched position P14 (X14, Y14).

Since the display unit 72 sends the touched position to the control unit 10 from time to time, the control unit 10 detects the change from the touched position P13 (X13, Y13) to the touched position P14 (X14, Y14), and calculates an angle θ formed between a straight line interconnecting the center of rotation of the wafer W and the touched position P13 and a straight line interconnecting the center of rotation of the wafer W and the touched position P14. The control unit 10 then controls only the rotating mechanism 33 to rotate the chuck table 28 in a direction from the touched position P13 to the touched position P14 through the angle θ calculated from the change in the touched position. The control unit 10 operates only the rotating mechanism 33 when the touched position P13 changes to the touched position P14, and does not operate the X-axis moving mechanism 31 and the Y-axis moving mechanism 32 even if the X and Y coordinates of the touched positions P13 and P14 are different from each other. Therefore, this individual function performing mode is different in operation from the free mode described above.

The individual function performing mode for individually selecting the X-axis moving function, the Y-axis moving function, and the rotating function are effective for an alignment process to be carried out in preparation for a laser processing process and also for a process for inspecting the surface of the wafer W. The individual function performing mode is used when the wafer W is to be moved in only the X-axis directions, the Y-axis directions, or the rotating directions.

The individual function performing mode may be used to select a state in which the laser processing apparatus 1 can operate in the same manner as the free mode. Specifically, the buttons 74a, 74b, and 74c of the individual function selection buttons 74 are made simultaneously selectable or activatable. When the operator touches the button 74a for selecting the X-axis moving mechanism 31 and the button 74b for selecting the Y-axis moving mechanism 32 at the same time, the operator can freely move the portion of the wafer W that is displayed in the display zone C in an X-axis direction, a Y-axis direction, or an oblique direction by touching the display zone C and moving the touched position in the display zone C, as described above with reference to FIGS. 3A through 3D. Furthermore, if all the three buttons 74a, 74b, and 74c are made simultaneously selectable or activatable, then the operator can rotate the portion of the wafer W that is displayed in the display zone C about the central point of the display zone C or any desired point thereof, as described above with reference to FIGS. 4A and 4B.

A projected dicing line detecting function according to the present embodiment will be described below. The projected dicing line detecting function is a function to detect, as a projected dicing line, a region formed to separate devices 14 on the face side of the wafer W. Details of the projected dicing line detecting function will be described below.

Prior to activating the projected dicing line detecting function, the X-axis moving mechanism 31, the Y-axis moving mechanism 32, and/or the rotating mechanism 33 are operated in the free mode or the individual function performing mode referred to above to position a projected dicing line 12a displayed in the display zone C parallel to the X-axis directions. Thereafter, the operator touches a projected dicing line detecting mode button displayed in the display zone B to select a projected dicing line detecting mode. When the projected dicing line detecting mode is selected, the projected dicing line detecting function is activated, displaying an initial screen illustrated in FIG. 8A in the display zone C of the display unit 72.

Figure 8A:
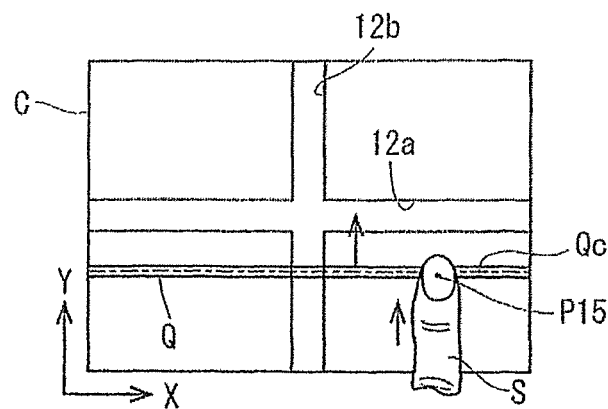
FIGS. 8A through 8D are views illustrating a mode of operation of a projected dicing line detecting function of the laser processing apparatus.

On the initial screen illustrated in FIG. 8A, a portion of the face side of the wafer W that includes the projected dicing line 12a positioned parallel to the X-axis directions is displayed, and a detection bar Q for detecting projected dicing lines is also displayed in a lower portion of the display zone C. The detection bar Q has a vertical width narrower or thinner than the projected dicing line 12a. A central line Qc indicated by the dot-and-dash line is also displayed at the transverse center of the detection bar Q.

In order to cause the control unit 10 to detect the projected dicing line 12a displayed in the display zone C, the operator touches the detection bar Q displayed in the display zone C at a position P15 with the finger S. With the control unit 10 having decided that the touched position P15 in the display zone C is on the detection bar Q, the operator moves the touched position, making it possible to move the detection bar Q in the vertical directions, i.e., the Y-axis directions. If the operator moves the touched position P15 toward the projected dicing line 12a that is visually recognized in the display zone C while touching the detection bar Q, the detection bar Q also moves following the touched position P15.

Figure 8B:
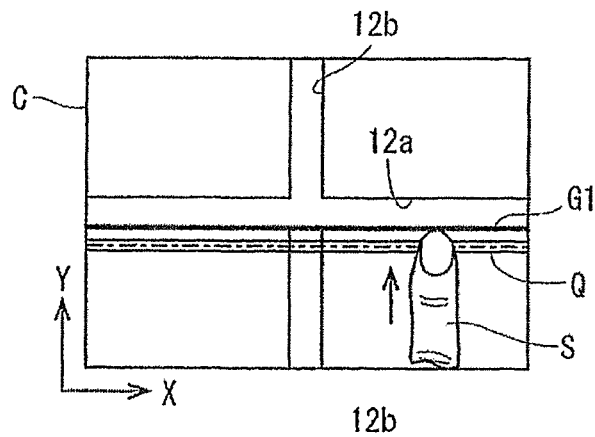

As illustrated in FIG. 8B, the operator moves the detection bar Q toward the projected dicing line 12a while touching the detection bar Q, and a predetermined region on the side of the detection bar Q in its moving direction reaches a lower straight-edge region of the projected dicing line 12a. The projected dicing line 12a displayed in the display zone C has upper and lower straight-edge regions extending in the X-axis directions, the upper and lower straight-edge regions having been recognized beforehand by the control unit 10 according to an image processing process. When the predetermined region on the side of the detection bar Q in its moving direction reaches the lower straight-edge region of the projected dicing line 12a, the control unit 10 generates a first straight line G1 indicated as a bold line in FIG. 8B and displays the first straight line G1 over the lower straight edge of the projected dicing line 12a. The predetermined region on the side of the detection bar Q in its moving direction may have a desired width, but should preferably have a width corresponding to the width of the projected dicing line 12a from a transverse end of the detection bar Q.

Figure 8C:
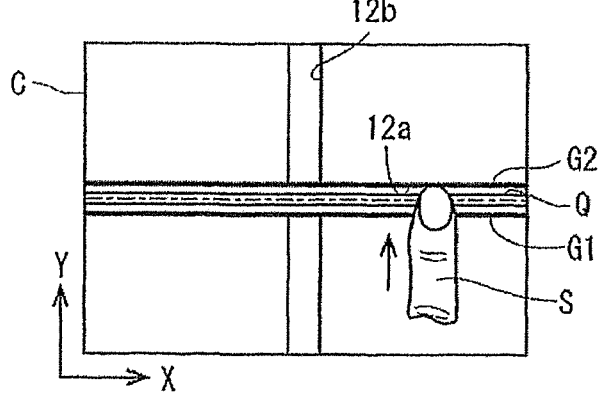
Figure 8D:
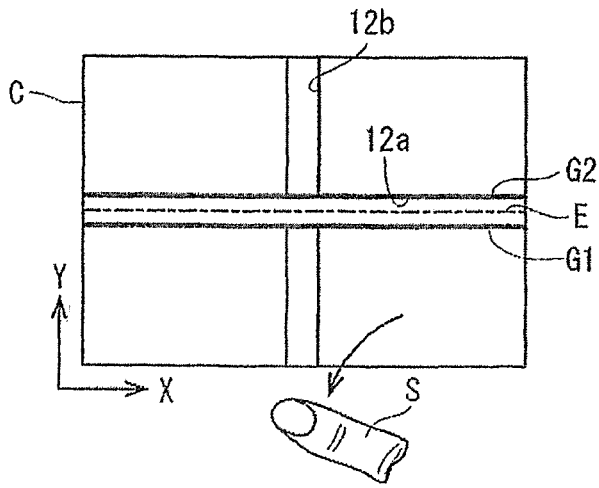

As described above, after the first straight line G1 has been generated and displayed over the lower straight edge of the projected dicing line 12a, the touched position P15 is moved upwardly to take the detection bar Q therewith beyond the lower straight edge of the projected dicing line 12a into the projected dicing line 12a. When the detection bar Q enters the projected dicing line 12a, the predetermined region on the side of the detection bar Q in its moving direction reaches the upper straight-edge region of the projected dicing line 12a. When the predetermined region on the side of the detection bar Q in its moving direction reaches the upper straight-edge region of the projected dicing line 12a, the control unit 10 generates a second straight line G2 indicated as a bold line in FIG. 8C and displays the second straight line G2 over the upper straight edge of the projected dicing line 12a. When the second straight line G2 is generated and displayed over the upper straight edge of the projected dicing line 12a, the operator takes the finger S off the display zone C, as illustrated in FIG. 8D. When the finger S leaves the display zone C, the detection bar Q disappears from the display zone C, and the first straight line G1 and the second straight line G2 are fixed in position and displayed, together with the central line Qc as a central line E therebetween. As the first straight line G1 and the second straight line G2 are positionally identified, a region sandwiched between the first straight line G1 and the second straight line G2 is detected as the projected dicing line 12a. Using the projected dicing line detecting function in this manner, the transverse dimension and position of the projected dicing line 12a is identified to a nicety.

According to the present embodiment, the projected dicing line detecting function makes it possible to detect two adjacent projected dicing lines and calculate the distance between the two adjacent projected dicing lines. Specifically, after the transverse dimension and position of a given projected dicing line 12a has been identified using the projected dicing line detecting function, the portion of the wafer W that is displayed in the display zone C is moved in one of the Y-axis directions in the individual function performing mode until another projected dicing line 12a that is positioned adjacent to the above given projected dicing line 12a in the other Y-axis direction is displayed in the display zone C. After the other adjacent projected dicing line 12a has been displayed, the transverse dimension and position of the other adjacent projected dicing line 12a is identified using the projected dicing line detecting function again. The positions of the given projected dicing line 12a, its central line E, the other adjacent projected dicing line 12a, and its central line E are identified, after which the distance between these two projected dicing lines 12a are calculated from the distance between the two central lines E. The calculated distance between these two projected dicing lines 12a is used as an actual indexing distance, which is compared with a designed indexing distance to determine whether the wafer W is suitable or not. The actual indexing distance may be used as a distance that the wafer W is to be indexing-fed during a laser processing process.

During a laser processing process, the wafer W is intermittently indexing-fed by the Y-axis moving mechanism 32 based on a designed indexing distance pre-registered in the control unit 10. An indexing distance checking function for checking whether the distance that the wafer W is indexing-fed is proper or not based on whether a first reference line and a second reference line overlap a projected dicing line 12a on the wafer W that has been indexing-fed or not will be described below.

Prior to activating the indexing distance checking function, the X-axis moving mechanism 31, the Y-axis moving mechanism 32, and/or the rotating mechanism 33 are operated in the free mode or the individual function performing mode referred to above to position a projected dicing line 12a displayed on the display zone C parallel to the X-axis directions. Thereafter, the operator touches an indexing distance checking mode button displayed in the display zone B to select an indexing distance checking mode. When the indexing distance checking mode is selected, the indexing distance checking function is activated, displaying an initial screen illustrated in FIG. 9A in the display zone C of the display unit 72.

Figure 9A:
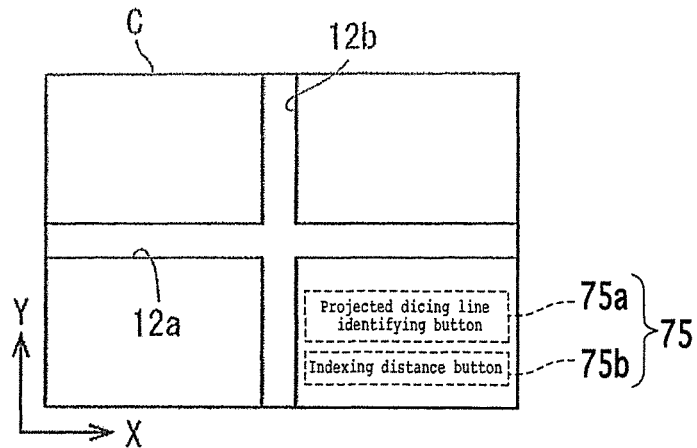
FIGS. 9A through 9C are views illustrating a mode of operation of an indexing distance checking function of the laser processing apparatus.

On the initial screen illustrated in FIG. 9A, a portion of the face side of the wafer W is displayed in the display zone C, and indexing distance check execution buttons 75 for executing a check on an indexing distance are displayed in a right lower portion, for example, of the display zone C. The indexing distance check execution buttons 75 include a projected dicing line identifying button 75a for detecting a projected dicing line and an indexing distance button 75b for checking an indexing distance. On the initial screen, the projected dicing line identifying button 75a and the indexing distance button 75b are displayed in a semitransparent state indicated by the dotted lines where the wafer W displayed in the display zone C can be seen through the buttons 75a and 75b, as illustrated in FIG. 9A.

Figure 9B:
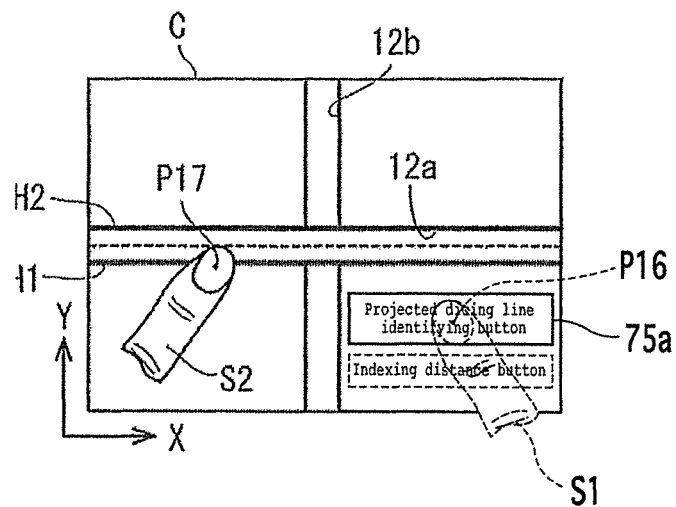

In order to check an indexing distance on the initial screen illustrated in FIG. 9A, the operator touches the projected dicing line identifying button 75a at a position P16 with a finger S1. When the control unit 10 recognizes that the touched position P16 where the display zone C is touched by the finger S1 is on the projected dicing line identifying button 75a, the control unit 10 makes a function thereof to identify a projected dicing line effective, and highlights the projected dicing line identifying button 75a as indicated by the solid lines in FIG. 9B.

When the function to identify a projected dicing line is made effective, the operator touches the display zone C at a position P17 with a finger S2. When the display zone C is touched, the control unit 10 displays a first reference line H1 in the display zone C. As the operator moves the touched position P17 vertically, the first reference line H1 also moves vertically, following the touched position P17. When the operator moves the touched position P17 to a lower straight edge, for example, of a projected dicing line 12a displayed in the display zone C and then takes the finger S2 off the display zone C, the first reference line H1 is displayed over the lower straight edge of the projected dicing line 12a and fixed in position. The operator then touches the display zone C again with the finger S2, whereupon the control unit 10 displays a second reference line H2 in the display zone C. The operator moves the touched position to an upper straight edge of the projected dicing line 12a, and then takes the finger S2 off the display zone C in the same manner as moving of the first reference line H1 described earlier. The second reference line H2 is displayed over the upper straight edge of the projected dicing line 12a and fixed in position. Now, the first reference line H1 and the second reference line H2 are displayed respectively over the lower and upper straight edges of the projected dicing line 12a, and the control unit 10 stores the positions of the first reference line H1 and the second reference line H2 (see FIG. 9B) in its RAM. If necessary, the control unit 10 may display a central line indicated by the dotted lines in FIG. 9B intermediate between the first reference line H1 and the second reference line H2. Alternatively, before the indexing distance checking function is activated, the projected dicing line detecting function described above with reference to FIGS. 8A through 8D may be performed. Specifically, if the first straight line G1 and the second straight line G2 (see FIGS. 8A through 8D) generated by the projected dicing line detecting function as defining the projected dicing line 12*a* are stored in the random access memory of the control unit 10, then at the time the operator touches the projected dicing line identifying button 75*a*, the first straight line G1 and the second straight line G2 may be displayed respectively as the first reference line H1 and the second reference line H2 over the lower and upper straight edges of the projected dicing line 12*a*.

Figure 9C:
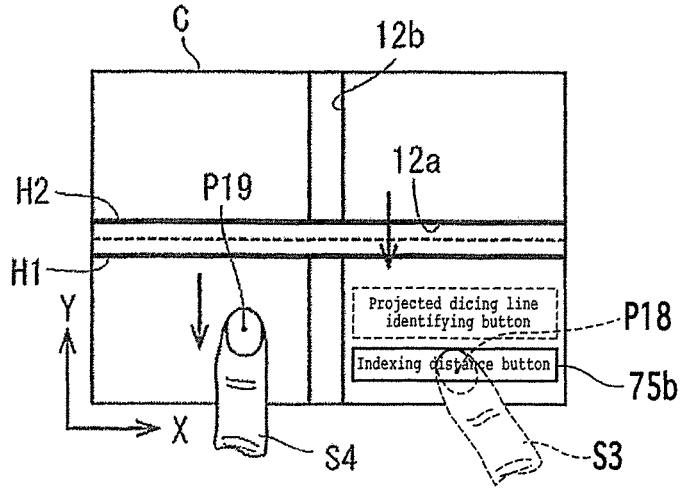

After the first reference line H1 and the second reference line H2 have been displayed respectively over the lower and upper straight edges of the projected dicing line 12*a*, the operator touches the indexing distance button 75*b* at a position P18 with a finger S3, as illustrated in FIG. 9C. When the control unit 10 detects that the touched position P18 is on the indexing distance button 75*b*, the control unit 10 makes the projected dicing line identifying button 75*a* ineffective and also makes the indexing distance button 75*b* effective and highlights the indexing distance button 75*b*, thereby activating a function thereof to execute a check on an indexing distance.

Then, the operator touches the display zone C at a desired position P19 with a finger S4 and quickly moves the touched position P19 downwardly as indicated by the arrow. When the control unit 10 detects the quick downward movement of the touched position P19, the control unit 10 operates the Y-axis moving mechanism 32 based on a designed indexing distance pre-registered in the control unit 10 to intermittently indexing-feed the chuck table 28 in a downward direction, i.e., one of the Y-axis directions.

After indexing-feeding the chuck table 28 a predetermined number of times, the control unit 10 stops operating the Y-axis moving mechanism 32 and calculates any deviation of a displayed projected dicing line 12*a* from the first reference line H1 and the second reference line H2 fixedly displayed in the display zone C. If the designed indexing distance pre-registered in the control unit 10 is proper with respect to actual distances between adjacent projected dicing lines 12*a* on the wafer W, then any projected dicing line 12*a* displayed in the display zone C is fully superposed on the first reference line H1 and the second reference line H2 even after the wafer W has been intermittently indexing-fed a predetermined number of times, whereupon the control unit 10 confirms that the designed indexing distance pre-registered in the control unit 10 is proper. However, if the designed indexing distance pre-registered in the control unit 10 is not proper, as the wafer W is repeatedly indexing-fed, projected dicing lines 12*a* successively displayed in the display zone C are progressively deviated from the first reference line H1 and the second reference line H2 fixedly displayed in the display zone C. When the control unit 10 detects such a deviation in excess of a predetermined width, the control unit 10 confirms that the designed indexing distance pre-registered in the control unit 10 is not proper. The control unit 10 calculates the deviation of the designed indexing distance pre-registered in the control unit 10 based on the detected deviation and the number of times that the wafer W is indexing-fed. The control unit 10 then corrects the designed indexing distance. By thus correcting the designed indexing distance, it is possible to set an appropriate indexing distance based on the actual distances between the projected dicing lines 12*a* on the wafer W.

According to the present embodiment, while images captured by the image capturing unit 60 are being displayed on the display means 70, it is possible to appropriately control the moving mechanism 30 to perform an alignment process in preparation for a laser processing process and also to perform a process for checking whether an indexing distance is proper or not. Consequently, the laser beam irradiating unit 50 can appropriately perform a laser processing process on the wafer W.

According to the above embodiment, a method of controlling a processing apparatus according to the present invention is applied to the laser processing apparatus for processing the wafer W. The present invention is not limited to the laser processing apparatus, but is also applicable to a cutting apparatus, also known as a dicing saw, for cutting a wafer along projected dicing lines with a cutting blade.

In a cutting apparatus, generally, a chuck table moves only in X-axis directions and a cutting unit or processing unit with a cutting blade mounted thereon moves in Y-axis directions. The method of controlling a processing apparatus according to the present invention is applicable to a processing apparatus including an X-axis moving mechanism moving a chuck table and a processing unit relatively to each other in X-axis directions, a Y-axis moving mechanism moving the chuck table and the processing unit relatively to each other in Y-axis directions perpendicular to the X-axis directions, and a rotating mechanism rotating the chuck table in a plane defined by an X-axis and a Y-axis. The processing apparatus according to the present invention is a processing apparatus in which an image capturing unit is integrally mounted on a processing unit and the processing unit and the image capturing unit simultaneously move in the same direction. The method of controlling a processing apparatus according to the present invention is also applicable to such a processing apparatus.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A method of controlling a processing apparatus including a chuck table for holding a workpiece, a processing unit processing the workpiece held on the chuck table, an X-axis moving mechanism moving the chuck table and the processing unit relatively to each other in an X-axis direction, a Y-axis moving mechanism moving the chuck table and the processing unit relatively to each other in a Y-axis direction perpendicular to the X-axis direction, an image capturing unit capturing an image of the workpiece held on the chuck table, a rotating mechanism rotating the chuck table in a plane defined by an X-axis and a Y-axis, a control unit controlling at least the X-axis moving mechanism, the Y-axis moving mechanism, and the rotating mechanism, and display means connected to the control unit for communication therewith, for displaying an image of a portion of the workpiece captured by the image capturing unit and detecting coordinates of a position touched on the display means by an operator, the method comprising:
operating the X-axis moving mechanism to move the chuck table or the processing unit in the X-axis direction for a distance depending on a distance that a finger is moved when the operator touches the display means with the finger and moves the finger in the X-axis direction, and moving the image of the portion of the workpiece captured by the image capturing unit in the X-axis direction on the display means;
operating the Y-axis moving mechanism to move the chuck table or the processing unit in the Y-axis direction for a distance depending on a distance that a finger is moved when the operator touches the display means with the finger and moves the finger in the Y-axis direction, and moving the image of the portion of the workpiece captured by the image capturing unit in the Y-axis direction on the display means;

operating the X-axis moving mechanism and the Y-axis moving mechanism to move the chuck table or the processing unit in the oblique direction for a distance depending on a distance that a finger is moved when the operator touches the display means with the finger and moves the finger in a direction oblique to the X-axis direction and the Y-axis direction, and moving the image of the portion of the workpiece captured by the image capturing unit in the oblique direction on the display means; and operating the rotating mechanism to rotate the chuck table for a distance depending on a distance that a finger is moved when the operator touches the display means with the finger and moves the finger in a rotating direction, and rotating the image of the portion of the workpiece captured by the image capturing unit on the display means wherein the workpiece includes a wafer having a plurality of devices formed on a face side thereof in respective areas that are demarcated by a plurality of intersecting projected dicing lines, and the method further comprises:

bringing a position where the finger touches the display means at a first position with respect to one of the projected dicing lines in the Y-axis direction after the wafer displayed on the display means is moved and the projected dicing lines on the wafer are positioned parallel to the X-axis direction, and displaying a first straight line over a straight-edge region of the one of the projected dicing lines which is detected first;

then moving the position where the finger touches the display means in the Y-axis direction to a second position that is within the projected dicing line, and displaying a second straight line over a straight-edge region of the projected dicing line which is detected next; and detecting a region sandwiched between the first straight line and the second straight line as a projected dicing line.

2. The method of controlling a processing apparatus according to claim 1, further comprising:

detecting two adjacent ones of the projected dicing lines and calculating a distance between the two adjacent projected dicing lines.

3. A method of controlling a processing apparatus including a chuck table for holding a workpiece, a processing unit processing the workpiece held on the chuck table, an X-axis moving mechanism moving the chuck table and the processing unit relatively to each other in an X-axis direction, a Y-axis moving mechanism moving the chuck table and the processing unit relatively to each other in a Y-axis direction perpendicular to the X-axis direction, an image capturing unit capturing an image of the workpiece held on the chuck table, a rotating mechanism rotating the chuck table in a plane defined by an X-axis and a Y-axis, a control unit controlling at least the X-axis moving mechanism, the Y-axis moving mechanism, and the rotating mechanism, and display means connected to the control unit for communication therewith, for displaying an image of a portion of the workpiece captured by the image capturing unit and detecting coordinates of a position touched on the display means by an operator, the method comprising:

operating the X-axis moving mechanism to move the chuck table or the processing unit in the X-axis direction for a distance depending on a distance that a finger is moved when the operator touches the display means with the finger and moves the finger in the X-axis direction, and moving the image of the portion of the workpiece captured by the image capturing unit in the X-axis direction on the display means;

operating the Y-axis moving mechanism to move the chuck table or the processing unit in the Y-axis direction for a distance depending on a distance that a finger is moved when the operator touches the display means with the finger and moves the finger in the Y-axis direction, and moving the image of the portion of the workpiece captured by the image capturing unit in the Y-axis direction on the display means;

operating the X-axis moving mechanism and the Y-axis moving mechanism to move the chuck table or the processing unit in the oblique direction for a distance depending on a distance that a finger is moved when the operator touches the display means with the finger and moves the finger in a direction oblique to the X-axis direction and the Y-axis direction, and moving the image of the portion of the workpiece captured by the image capturing unit in the oblique direction on the display means; and operating the rotating mechanism to rotate the chuck table for a distance depending on a distance that a finger is moved when the operator touches the display means with the finger and moves the finger in a rotating direction, and rotating the image of the portion of the workpiece captured by the image capturing unit on the display means wherein the workpiece includes a wafer having a plurality of devices formed on a face side thereof in respective areas that are demarcated by a plurality of intersecting projected dicing lines, and the method further comprises:

displaying a first reference line and a second reference line that initiate from one of the projected dicing lines on both sides of the one of the projected dicing lines in the Y-axis direction when the operator touches the display means and positions the projected dicing lines on the wafer parallel to the X-axis direction;

indexing-feeding the wafer in the Y-axis direction for a distance depending on a pre-registered distance between adjacent ones of the projected dicing lines when the operator touches the display means and moves the image of the portion of the workpiece captured by the image capturing unit in the Y-axis direction; and checking if the distance between the adjacent projected dicing lines is proper or not depending on whether the first reference line and the second reference line are superposed on a second projected dicing line on the wafer that is indexing-fed.

* * * * *